(12) United States Patent
Nishifukumoto

(10) Patent No.: US 10,483,835 B2
(45) Date of Patent: Nov. 19, 2019

(54) LINEAR MOTOR

(71) Applicant: FANUC CORPORATION, Yamanashi (JP)

(72) Inventor: Akira Nishifukumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 37 days.

(21) Appl. No.: 15/993,684

(22) Filed: May 31, 2018

(65) Prior Publication Data
US 2018/0367020 A1    Dec. 20, 2018

(30) Foreign Application Priority Data

Jun. 19, 2017 (JP) .................................. 2017-119928

(51) Int. Cl.
*H02K 41/02* (2006.01)
*H02K 41/03* (2006.01)
*H02K 1/08* (2006.01)

(52) U.S. Cl.
CPC .............. *H02K 41/031* (2013.01); *H02K 1/08* (2013.01)

(58) Field of Classification Search
CPC .......... H02K 41/031; H02K 1/08; H02K 1/14; H02K 41/02; H02K 41/03
USPC ........................................... 310/12.05, 12.18
See application file for complete search history.

(56) References Cited

U.S. PATENT DOCUMENTS

| | | | | |
|---|---|---|---|---|
| 5,910,691 A * | 6/1999 | Wavre | ................... | H02K 41/03 310/12.18 |
| 6,476,524 B1 * | 11/2002 | Miyamoto | ........... | H02K 41/031 310/12.19 |
| 7,679,226 B2 * | 3/2010 | Jajtic | ..................... | H02K 41/03 310/12.05 |
| 7,834,489 B2 * | 11/2010 | Matscheko | ............ | H02K 41/03 310/12.01 |

(Continued)

FOREIGN PATENT DOCUMENTS

| | | |
|---|---|---|
| CN | 102510202 A | 6/2012 |
| CN | 104410245 A | 3/2015 |

(Continued)

OTHER PUBLICATIONS

An Office Action mailed by the Chinese Patent Office dated Jun. 13, 2019, which corresponds to Chinese Patent Application No. 201810613324.0 and is related to U.S. Appl. No. 15/993,684; with partial English language translation.

(Continued)

*Primary Examiner* — Thanh Lam
(74) *Attorney, Agent, or Firm* — Studebaker & Brackett PC

(57) ABSTRACT

A linear motor includes a magnet plate on which magnets of different polarity are alternately arranged along a drive direction, and an armature having a core serving as a main body and a coil attached to the core. The magnet plate and the armature are made to relatively move along an arrangement direction of the magnets, by way of thrust produced between the magnet plate and the armature. The magnet plate has a non-thrust region that extends along an arrangement direction of the magnets, and does not contribute to the thrust. The core of the armature at least includes a plurality of main teeth to which the coil is attached. The main teeth (Continued)

are not provided in a region opposing the non-thrust region of the magnet plate.

2 Claims, 6 Drawing Sheets

(56) References Cited

U.S. PATENT DOCUMENTS

| | | | |
|---|---|---|---|
| 2013/0076159 A1* | 3/2013 | Chung | H02K 21/16 |
| | | | 310/12.18 |
| 2016/0126820 A1* | 5/2016 | Maeda | H02K 41/031 |
| | | | 310/12.25 |

FOREIGN PATENT DOCUMENTS

| | | |
|---|---|---|
| CN | 105207446 A | 12/2015 |
| CN | 106685177 A | 5/2017 |
| CN | 208209778 U | 12/2018 |
| JP | 2000-217334 A | 8/2000 |
| JP | 2015-8555 A | 1/2015 |
| JP | 2016-092842 A | 5/2016 |

OTHER PUBLICATIONS

An Office Action; "Notification of Reasons for Refusal," issued by the Japanese Patent Office dated Nov. 20, 2018, which corresponds to Japanese Patent Application No. 2017-119928 and is related to U.S. Appl. No. 15/993,684.

* cited by examiner

LINEAR MOTOR

This application is based on and claims the benefit of priority from Japanese Patent Application No. 2017-119928, filed on Jun. 19, 2017, the content of which is incorporated herein by reference.

BACKGROUND OF THE INVENTION

Field of the Invention

The present invention relates to a linear motor.

Related Art

In recent years, the use of linear motors as the drive device of a variety of kinds of industrial machines such as the magnetic head drive mechanism of an OA machine, and spindle/table feed mechanism of a machine tool, have been proposed. In this type of linear motor, magnet plates made by arranging a plurality of plate-shaped permanent magnets in planar form have been widely used as the field magnetic poles (for example, refer to Patent Documents 1 and 2).

Patent Document 1: Japanese Unexamined Patent Application, Publication No. 2000-217334

Patent Document 2: Japanese Unexamined Patent Application, Publication No. 2016-92842

SUMMARY OF THE INVENTION

In the aforementioned linear motors, if widening the width of the magnet plate (width in direction orthogonal to the movement direction of armature), the flexural rigidity of the magnet plate will lower. In this case, the magnet plate will deform to the armature side due to the attractive force of the magnetic field generated with the armature, and it becomes difficult to maintain the spacing between the armature and magnet plate at the appropriate interval.

In order to solve this, the increasing of the number of bolts fixing the magnet plate to the machine mounting part to suppress deformation of the magnet plate has also been carried out. For example, it is a configuration that adds a bolt not only to both ends in the width direction of the magnet plate, but also to the central part thereof. In the case of establishing such a configuration, since the permanent magnet is not provided at the periphery of the added bolts, it becomes a region not contributing to the thrust of the armature. However, since the magnetic flux generated at the armature focuses on the end of the permanent magnet provided to the periphery of the added bolt, there is a problem in that the end of the permanent magnet tends to be demagnetized. Demagnetization refers to the magnetism of the permanent magnet weakening permanently.

The object of the present invention is to provide a linear motor which can suppress demagnetization of the permanent magnets at the periphery of a region not contributing to the thrust of the armature.

A first aspect of the present invention is a linear motor (for example, the linear motor 1 described later) including: a magnet plate (for example, the magnet plate 10 described later) on which magnets (for example, the magnet 12 described later) of different polarity are alternately arranged along a movement direction; and an armature (for example, the armature 20 described later) having a core (for example, the core 21 described later) serving as a main body and a coil (for example, the coil 22 described later) attached to the core, wherein the magnet plate and the armature are made to relatively move along an arrangement direction of the magnets, by way of thrust produced between the magnet plate and the armature, in which the magnet plate has a non-thrust region (for example, the non-thrust region D2 described later) that extends along an arrangement direction of the magnets, and does not contribute to the thrust; and the core of the armature at least includes a plurality of main teeth to which the coil is attached, in which the main teeth are not provided in a region opposing the non-thrust region of the magnet plate.

According to a second aspect of the present invention, in the linear motor as described in the first aspect, a configuration may be made in which the core of the armature includes a plurality of the main teeth and an auxiliary tooth provided between the main teeth which are adjacent, and the main teeth are not provided in a region opposing the non-thrust region of the magnet plate.

According to a third aspect of the present invention, in the linear motor as described in the first aspect, a configuration may be made in which the core of the armature includes a plurality of the main teeth and an auxiliary tooth provided between the main teeth which are adjacent; and the main teeth and the auxiliary teeth are not provided in a region opposing the non-thrust region of the magnet plate.

According to a fourth aspect of the present invention, in the linear motor as described in the first aspect, a configuration may be made in which the core of the armature includes only a plurality of the main teeth, and the main teeth are not provided in a region opposing the non-thrust region of the magnet plate.

According to a fifth aspect of the present invention, in the linear motor as described in any one of the first to fourth aspects, the non-thrust region of the magnet plate may be a region in which the magnet is not provided.

According to the present invention, it is possible to provide a linear motor that can suppress demagnetization of a permanent magnet in the vicinity of a region not contributing to thrust of an armature.

DETAILED DESCRIPTION OF THE INVENTION

Hereinafter, an embodiment of the present invention will be explained. It should be noted that the drawings attached to the present disclosure are all schematic diagrams, and the shape of each part, scaling, length/width dimensional ratios, etc. are modified or exaggerated by considering the easy of understanding, etc. In addition, the drawings omit as appropriate the hatching indicative of cross-sections of members, etc.

In the present disclosure, etc., the terms specifying the shape, geometrical conditions, and extents thereof, for example, terms such as "parallel" and "direction", in addition to the strict meanings of these terms, include the scope of an extent considered to be substantially parallel, and a scope considered to be generally this direction. In the present disclosure, etc., the direction corresponding to the movement direction of an armature 20 in the linear motor 1 is defined as X (X1-X2) direction, the direction corresponding to the width. (short end) direction of the linear motor I is defined as Y (Y1-Y2) direction, and the direction corresponding to the thickness direction is defined as Z (Z1-Z2) direction. In addition, it is similarly defined also for a machine mounting part 30 to which the linear motor 1 is installed.

Figure 1:
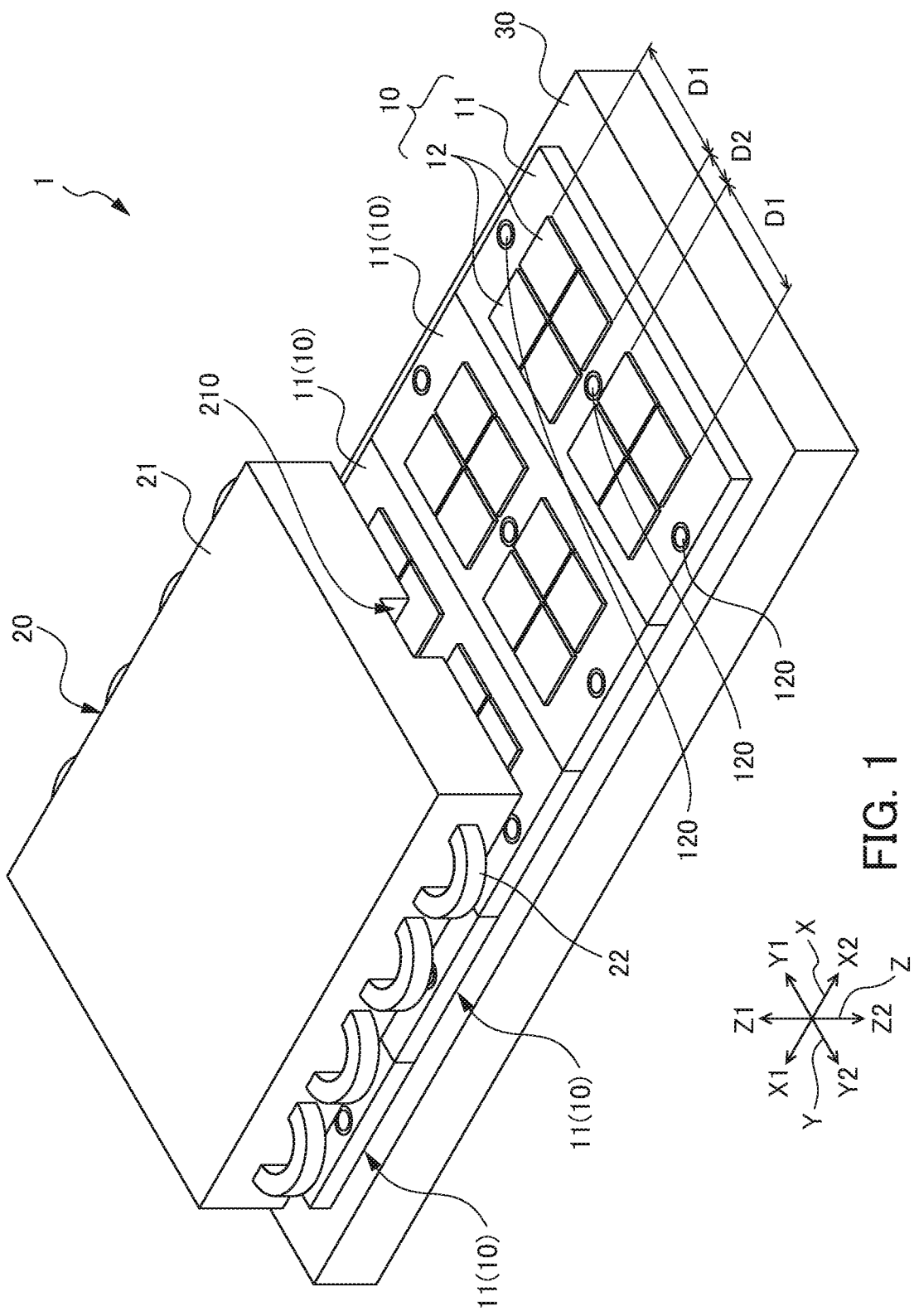
FIG. 1 is a perspective view showing an outline of a linear motor 1 of a first embodiment.
Figure 2:
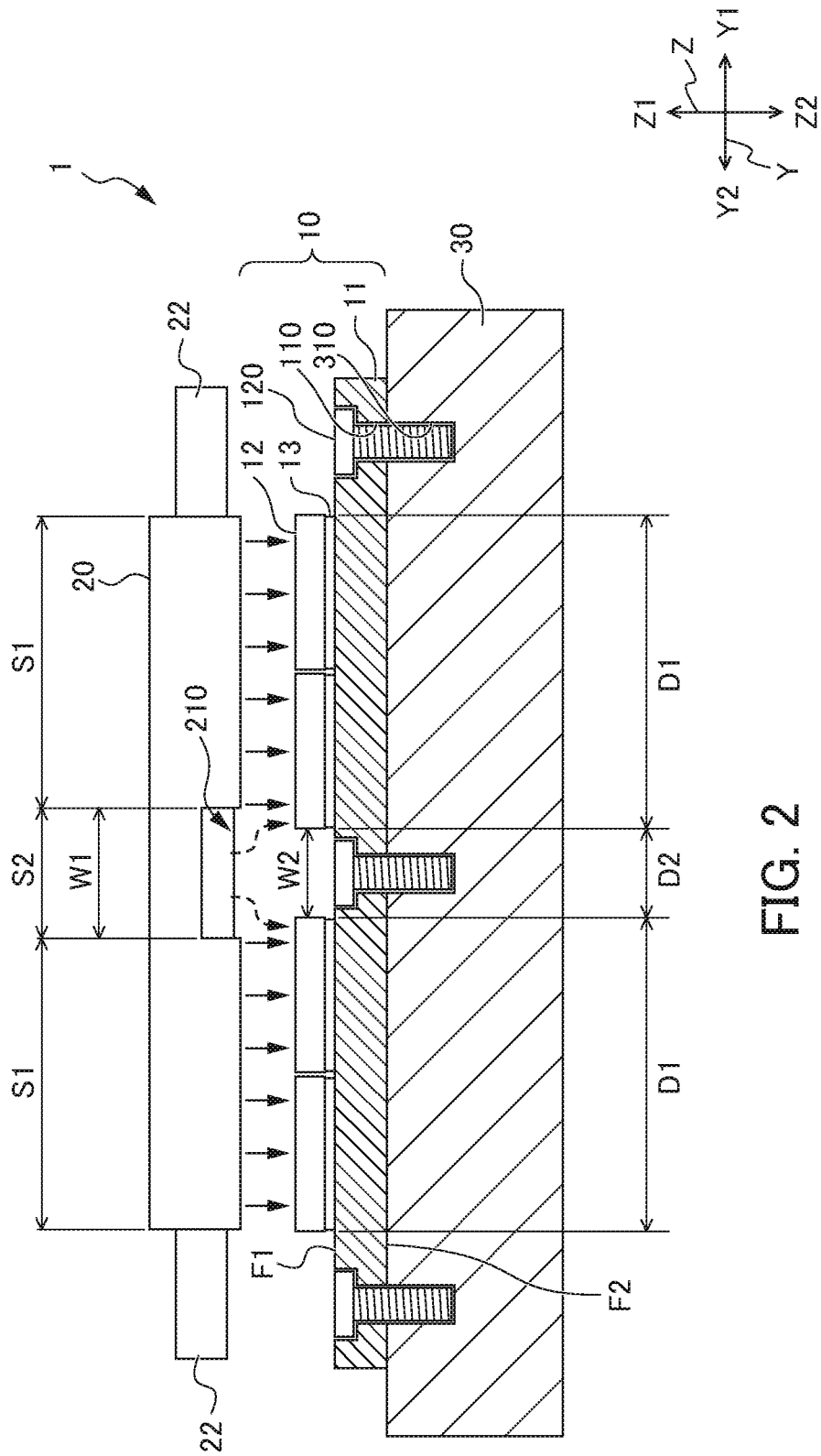
FIG. 2 is a cross-sectional view of the linear motor 1.
Figure 3:
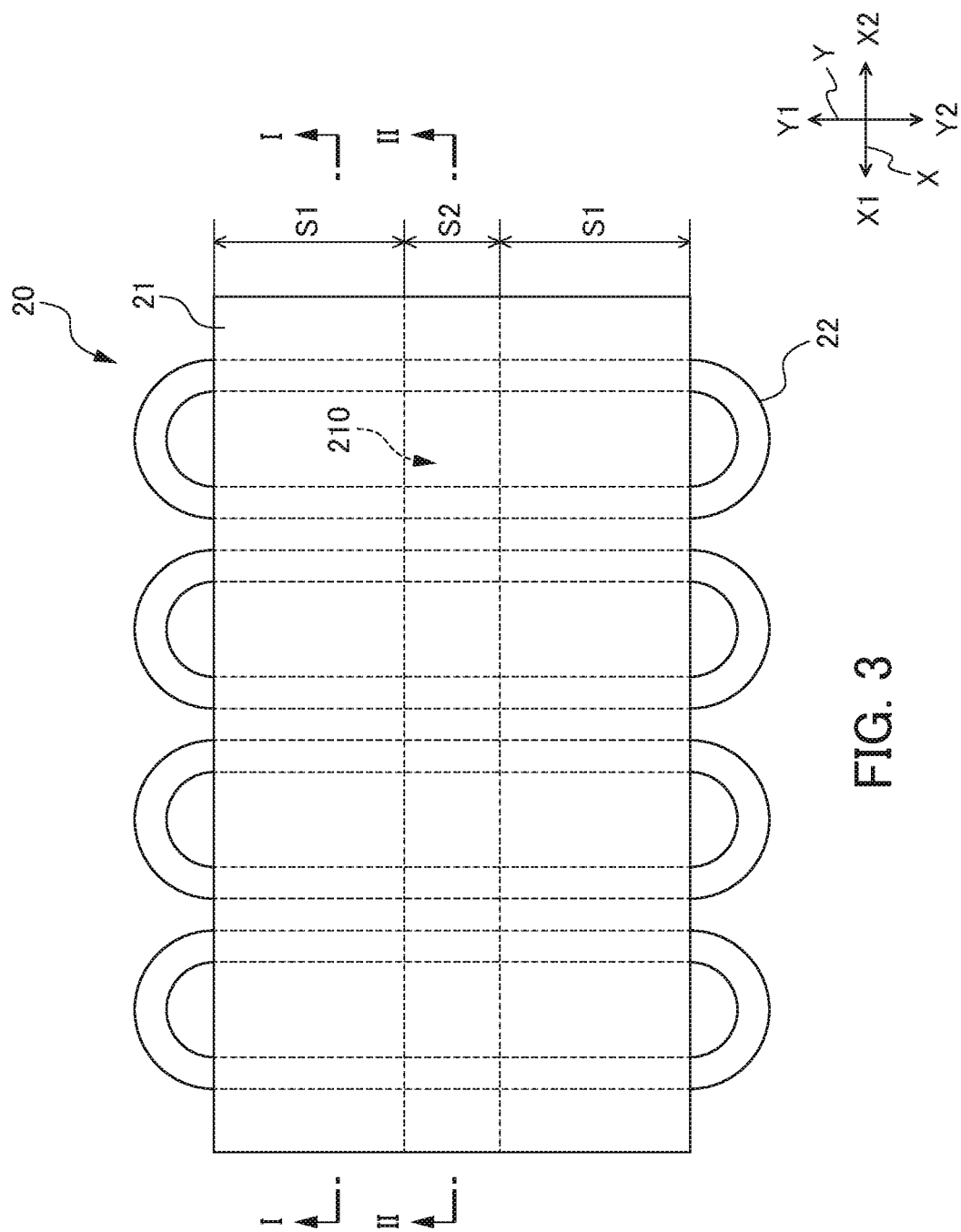
FIG. 3 is a plan view of an armature 20.
Figure 4A:
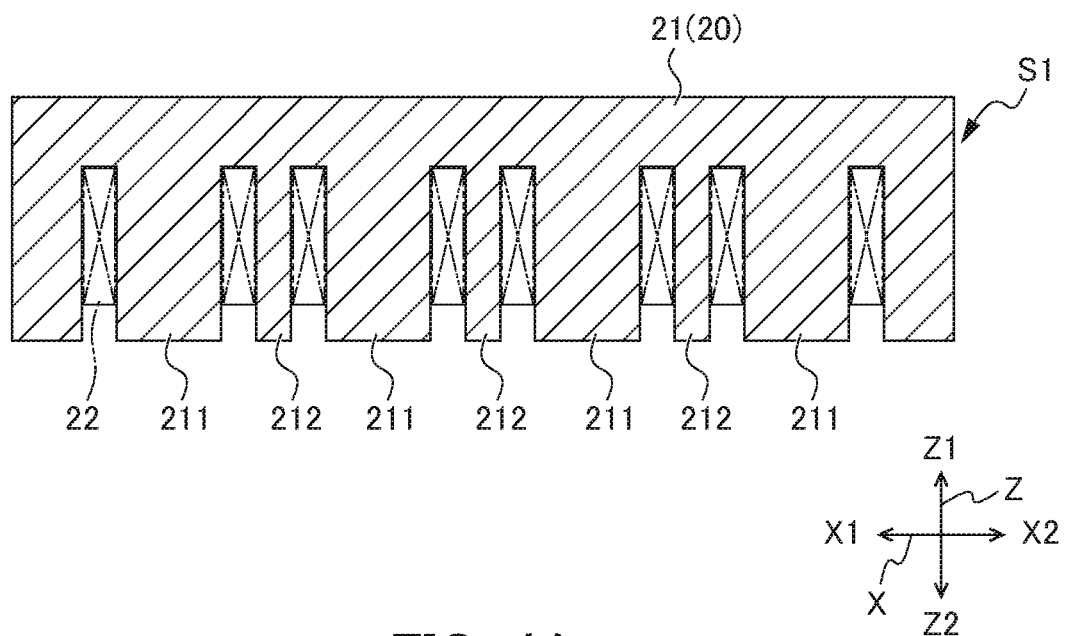
FIG. 4A is a cross-sectional view corresponding to the line I-I in FIG. 3.
Figure 4B:
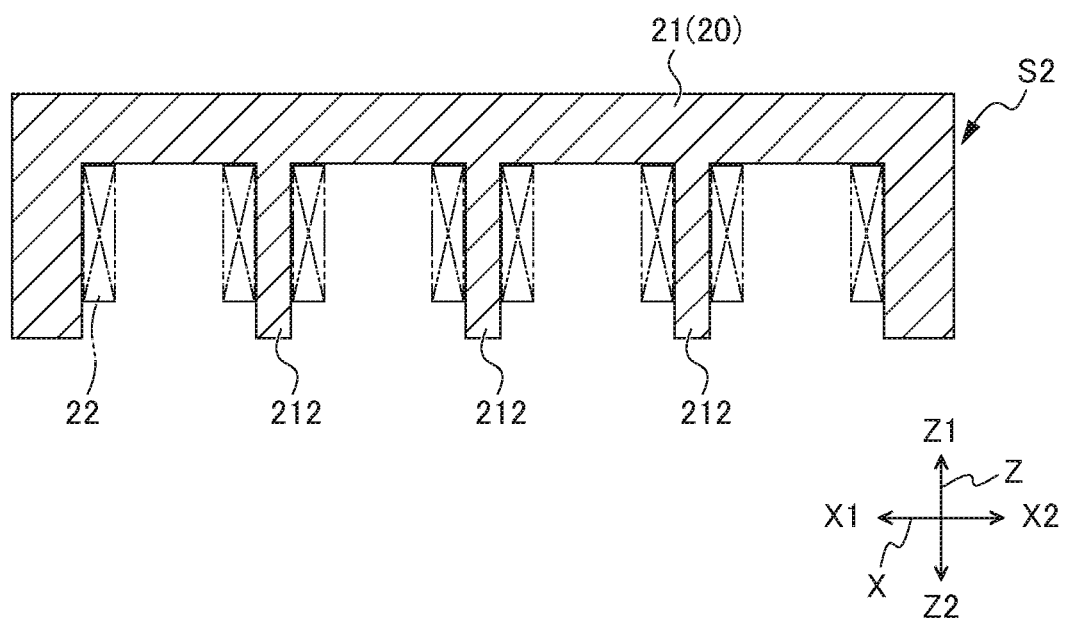
FIG. 4B is a cross-sectional view corresponding to the line II-II FIG. 3.

FIG. 1 is a perspective view showing an outline of the linear motor 1 of the first embodiment. FIG. 2 is a cross-sectional view of the linear motor 1. FIG. 2 shows a cross section in a plane parallel to the Y-Z plane of the linear motor 1. It should be noted that FIG. 2 shows the external appearance rather than the cross section of a bolt, and omits male thread grooves, female thread grooves, etc. FIG. 3 is a plan view of an armature 20. FIG. 4A is a cross-sectional view corresponding to the line I-I in FIG. 3. FIG. 4B is a cross-sectional view corresponding to the line II-II in FIG. 3.

As shown in FIG. 1, the linear motor 1 of the present embodiment includes a plurality of magnet plates 10, and the armature 20. The magnet plates 10 are field magnetic poles in which permanent magnets 12 (described later) of different polarity are alternately arranged along the movement direction (X direction) of the armature 20. The magnet plate 10 generates driving force for causing the armature 20 to move linearly in cooperation with the armature 20. As shown in FIG. 2, the magnet plate 10 includes the plate 11, permanent magnet 12, and joining layer 13.

The plate 11 is a plate-like metallic member. The plate 11 has a first face F1 serving as a surface on a Z1 side, and a second face F2 serving as a surface on a Z2 side, as shown in FIG. 2. The first face F1 is a surface on a side on which a plurality of the permanent magnets 12 is arranged. The second face F2 is a surface on a side fixed to the machine mounting part 30 (described later). The plate 11, for example, is formed by a laminated body of silicon steel plate, carbon steel, general structural rolled steel, or the like.

In the linear motor 1 of the present embodiment, five of the plates 11 (magnet plates 10) are arranged along the movement direction (X direction) of the armature 20, as shown in FIG. 1. Eight of the permanent magnets 12 are arranged on the first face F1 of each plate 11, respectively. It should be noted that the magnet plates 10 may be arranged in a state slightly skewed (slanted) relative to the movement direction of the armature 20. In addition, the number, shape, etc. of magnet plates 10 are not limited to the examples of the present embodiment, and are set as appropriate according to the specifications, etc. of the linear motor 1.

The plate 11 includes stepped holes 110 in the central part in the Y direction, and the ends in the Y1 and Y2 direction, respectively, as shown in FIG. 2. The stepped hole 110 is a hole into which a bolt 120 (described later) is inserted upon fixing the plate 11 to the machine mounting part 30. It should be noted that reference symbols are attached only to the stepped hole 110 and bolt 120 provided the most to the Y2 side.

The permanent magnet 12 is a member that generates a magnetic field, and is arranged via the joining layer 13 on the first face F1 of the plate 11, as shown in FIG. 2. For the permanent magnets 12, N-pole permanent magnets 12 and S-pole permanent magnets 12 are alternately arranged along the movement direction (X direction) of the armature 20, on the first face F1 of the plate 11. The joining layer 13 is a layer joining the plate 11 and permanent magnet 12, and is formed by adhesive, for example.

In the present embodiment, eight of the permanent magnets 12 are arranged in a pattern of 4 (Y direction)×2 (X direction), on one plate 11, as shown in FIG. 1. These permanent magnets 12 are not provided in a peripheral region of the bolt 120 provided at the central part in the Y direction. This is because, upon installing to the machine mounting part 30, a space for fitting a tool to the bolt is necessary on the Z1 side of the bolt 120.

In the magnet plate 10, regions contributing to the thrust of the armature 20 (hereinafter also referred to as "thrust region D1") are formed on the Y1 side and Y2 side to sandwich therebetween the peripheral region of the bolt 120 provided at the central part in the Y direction. In this thrust region D1, four of the permanent magnets 12 are arranged in a 2 (Y direction)×2 (X direction) pattern, respectively. The thrust region D1 extends in the arrangement direction (X direction) of the permanent magnets 12, as shown in FIG. 1. It should be noted that the number, arrangement form, etc. of the permanent magnets 2 arranged in the thrust region D1 are not limited to the example of the present embodiment, and are set as appropriate according to the specifications, etc. of the linear motor 1.

In addition, in the peripheral region of the aforementioned bolt 120, a non-thrust region D2 not contributing to the thrust of the armature 20 is formed. The non-thrust region D2 is a region in which the permanent magnets 12 are not provided. The non-thrust region D2 also extends in the arrangement direction (X direction) of the permanent magnets 12, similarly to the thrust region D1.

The machine mounting part 30, for example, is a location at which the linear motor 1 is installed, as a drive device of a magnetic head drive mechanism of an OA machine, spindle/table feed mechanism of a machine tool, or the like. In the present embodiment, although the machine mounting part 30 is illustrated as a plate-shaped member, in reality, it has a shape depending on the machine to be installed.

In the machine mounting part 30, a bolt hole 310 is provided at a position corresponding to the stepped hole 110 of the plate 11 (position at which both centers overlap), as shown in FIG. 2. The bolt hole 310 has, at an inner circumferential surface, a female thread which can screw together with the male thread of the bolt 120 inserted into the stepped hole 110 of the plate 11 (magnet plate 10).

The armature 20 generates driving force for causing the armature 20 to move linearly in cooperation of the magnet plate 10. The armature 20 includes a core 21 serving as a main body, and a coil 22, as shown in FIGS. 1 and 2. The core 21 is a member serving as the main body of the armature 20. The core 21, for example, is configured as a structure made by superimposing a plurality of plates consisting of magnetic material. The coil 22 is a wire wound around main teeth 211 (described later) of the core 21. Alternating current electric power from an external power supply device is supplied to the coil 22. The present embodiment omits illustration of cables, etc. supplying electric power to the coil 22 of the armature 20.

The core 21 includes a groove 210 in a surface on the Z2 side, as shown in FIGS. 1 and 2. The groove 210 is a region indented in an inverse concave shape from the surface on the Z2 side of the core 21 towards the Z1 side thereof. The groove 210 extends along the X direction of the core 21. In the groove 210 of the present embodiment, auxiliary teeth 212 (described later) are provided so as to cut across the groove 210 in the extending direction thereof (X direction).

The core 21 is demarcated into a slot region S1 and opening region S2 in the Y-Z plane, as shown in FIG. 3. The slot region S1 is a region in which pluralities of main teeth 211 and auxiliary teeth 212 are formed as shown in FIG. 4A. The main teeth 211 are teeth in which the coil 22 is wound. The auxiliary teeth 212 are teeth provided between adjacent main teeth 211. The main teeth 211 and auxiliary teeth 212 are formed alternately. The slot region S1 of the core 21 opposes the thrust region D1 of the magnet plate 10 in the Z1 direction, as shown in FIG. 2.

The opening region S2 is a region opposing the non-thrust region D2 of the magnet plate 10, and is formed in the aforementioned groove 210. In the opening region S2, the main teeth 211 are not formed, and only the auxiliary teeth 212 are formed, as shown in FIG. 4B. In other words, the main teeth 211 are only formed in the slot region S1 on the Y1 side and the slot region S1 on the Y2 side. In addition, the auxiliary teeth 212 cut across the opening region S1 from the slot region S1 on the Y1 side, and extend until the slot region S1 on the Y2 side.

As shown in FIG. 2, the opening region S2 of the armature 20 and the non-thrust region D2 of the magnet plate 10, in the case of configuring the armature 20 and magnet plate 10 as the linear motor 1, are set so that the centers in the Y direction substantially match each other. In addition, the width W1 of the opening region S2 of the armature 20 is set so as to be wider than the width W2 of the non-thrust region D2 of the magnet plate 10. This is because, when the end of the opening region S2 of the armature 20 is positioned biasing the inside of the non-thrust region D2 of the magnet plate 10 in the Y direction, the magnetic flux generated by the armature 20 tends to focus on the end of the permanent magnets 12 arranged at both sides of the non-thrust region D2. For this reason, in a state in which the mutual centers of the opening region S2 of the armature 20 and the non-thrust region D2 of the magnet plate 10 substantially match, it is preferable for the width W1 of the opening region S2 to be set to be at least the same as the width W2 of the non-thrust region D2, and is more preferable to make wider than the width W2 of the non-thrust region D2. The ratio of the width W1 of the opening region S2 to the width W2 of the non-thrust region D2 is preferably set on the order of 1.1 to 1.0, for example.

When applying single-phase alternating current or three-phase alternating current as electric power to the coil 22 of the armature 20 configured in the above-mentioned way, attractive force and repulsive force act between the magnetic flux produced by the coil 22 (movement magnetic field) and the magnetic field of the magnet plate 10, and the thrust is provided to the armature 20 by the component in the movement direction (X direction) thereof. By way of this thrust, the armature 20 moves linearly along the X direction in which the permanent magnets 12 of the magnet plate 10 are arranged, as shown in FIG. 1.

The above-mentioned thrust is produced by the attractive force and repulsive force acting between the magnetic flux generated from the slot region S1 of the core 21 (armature 20) to the thrust region D1 of the magnet plate 10 (solid arrow pointing down) and the magnetic field of the magnet plate 10, as shown in FIG. 2. On the other hand, the permanent magnets 12 are not provided to the non-thrust region D2 of the magnet plate 10, and the main teeth 211 required in the formation of magnetic flux are not formed in the opening region S2 of the core 21. For this reason, the magnetic flux produced at the coil 22 between the non-thrust region D2 and opening region S2 is weak compared to between the thrust region D1 in which main teeth 211 are formed and the slot region S1, and thus the attractive force and repulsive force do not act between the magnetic flux produced by the coil 22 and the magnetic field of the magnet plate 10; therefore, almost no thrust is produced on the armature 20.

The phenomenon of almost no thrust being produced between the aforementioned non-thrust region D2 and opening region S2 can similarly occur also between the opening region S2 and the core of a conventional configuration to which the main teeth 211 and auxiliary teeth 212 are provided over the entire region. However, with the core of such a conventional configuration, since magnetic flux produced by the armature 20 focuses on the ends of the permanent magnets 12 arranged at both sides of the non-thrust region D2, the permanent magnets 12 arranged at both sides of the non-thrust region D2 are demagnetized.

On the other hand, according to the configuration of the present embodiment, magnetic flux generated at the armature 20 (opening region S2 of core 21) hardly concentrates on the ends of the permanent magnets 12 arranged on both sides of the non-thrust region D2, as shown in FIG. 2. FIG. 2 shows the magnetic flux produced at the core of conventional configuration to which the main teeth 211 and auxiliary teeth 212 are provided to the entire region by the dotted arrow; however, for the magnet plate 10 and core 21 of the present embodiment, the magnetic flux of the dotted line as in the illustration hardly concentrates on the ends of the permanent magnets 12 arranged at both sides of the non-thrust region D2. Therefore, according to the aforementioned linear motor 1 of the present embodiment, it is possible to suppress demagnetization of the permanent magnets 12 arranged at both sides of the non-thrust region D2.

(Second Embodiment)

Figure 5:
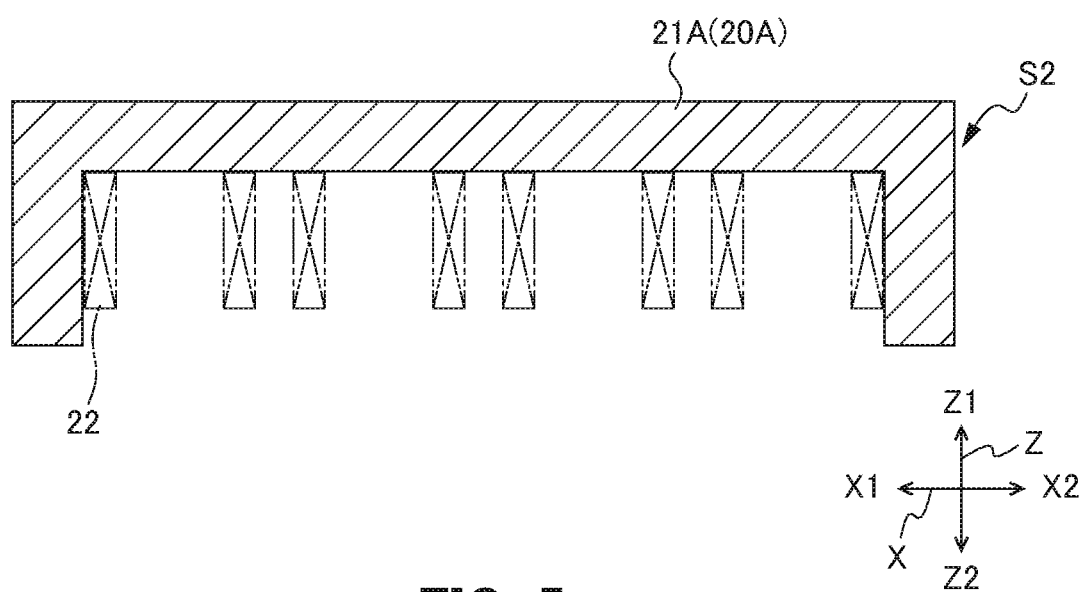
FIG. 5 is a cross-sectional view of an opening region S2 of an armature 20A of a second embodiment.

FIG. 5 is a cross-sectional view of an opening region S2 of an armature 20A of a second embodiment. FIG. 5 corresponds to a cross section of the line II-II in FIG. 3. In the second embodiment, the same reference symbols are attached to portions equivalent to the first embodiment, and otherwise redundant explanations will be omitted.

As shown in FIG. 5, neither of the main teeth 211 and auxiliary teeth 212 are formed in the opening region S2 of a core 21A of the armature 20A according to the second embodiment, and only the coil 22 is present. It should be noted that, although not illustrated, the configuration of the slot region S1 of the core 21A is the same as the first embodiment (refer to FIG. 4A). In the case of the slot region S1 of the core 21A being configured by the pluralities of main teeth 211 and auxiliary teeth 212 in this way, the opening region S2 may be made a configuration in which neither of the main teeth 211 and auxiliary teeth 212 are formed.

Also in the armature 20A of the second embodiment, since the magnetic flux generated by the armature 20A (opening region S2 of core 21A) hardly concentrates on the ends of the permanent magnets 12 arranged at both sides of the non-thrust region D2, it is possible to suppress demagnetization of the permanent magnets 12 arranged at both sides of the non-thrust region D2.

(Third Embodiment)

Figure 6A:
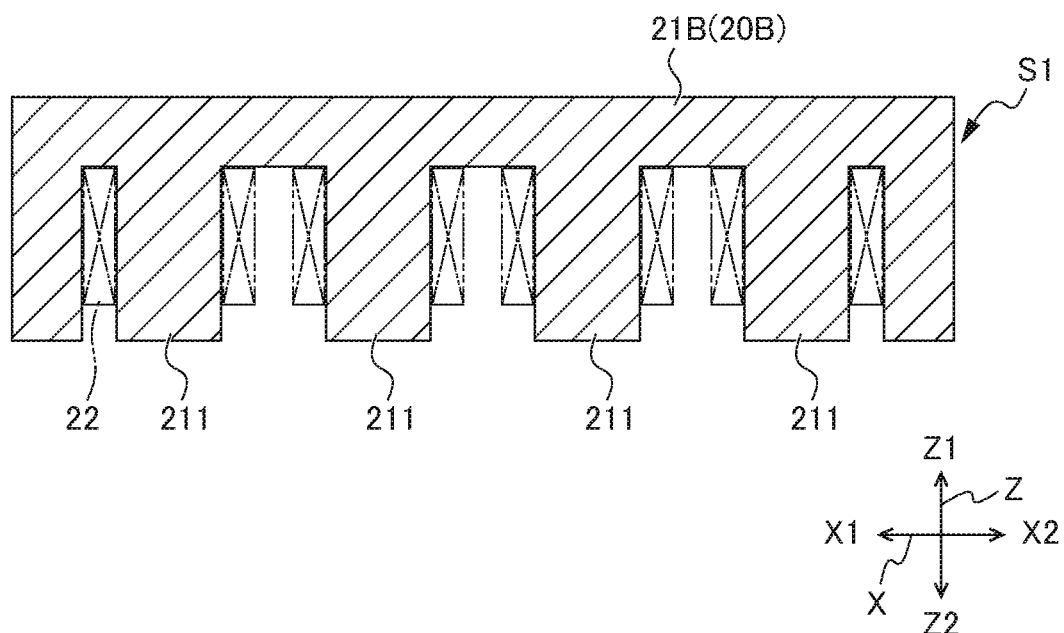
FIG. 6A is a cross-sectional view of a slot region S1 of an armature 20B of a third embodiment.
Figure 6B:
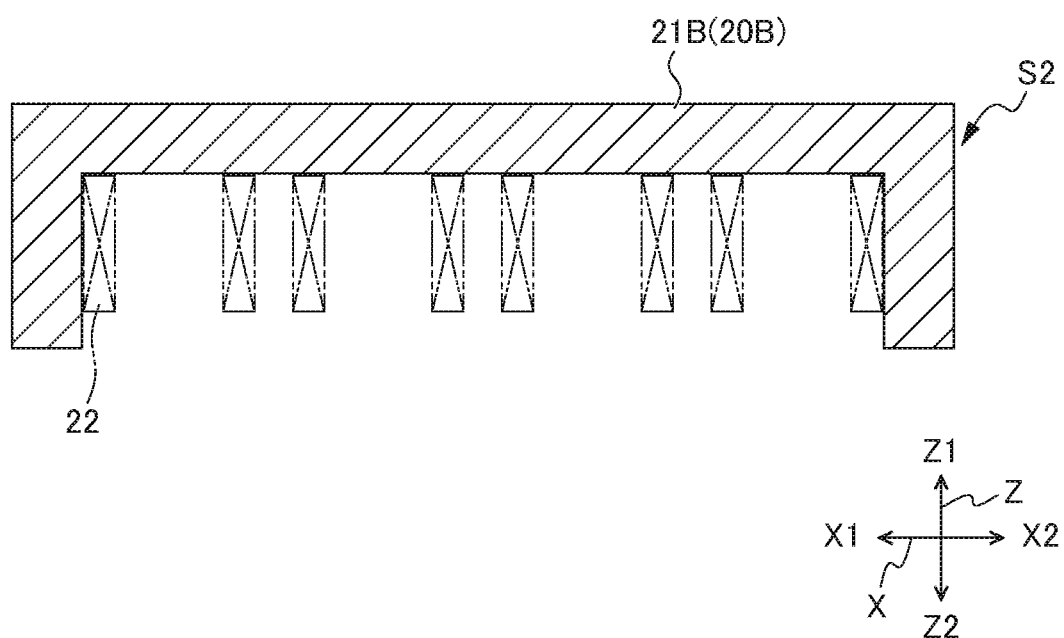
FIG. 6B is a cross-sectional view of an opening region S2 of the armature 20B of the third embodiment.

FIG. 6A is a cross-sectional view of a slot region S1 of an armature 20B of a third embodiment. FIG. 6A corresponds to a cross section of the line I-I in FIG. 3. FIG. 6B is a cross-sectional view of an opening region S2 of the armature 20B of the third embodiment. FIG. 6B corresponds to a cross section of the line II-II in FIG. 3.

As shown in FIG. 6A, only the plurality of main teeth 211 is formed in the slot region S1 of the core 21B of the armature 20B according to the third embodiment, and the auxiliary teeth 212 are not formed. In addition, as shown in FIG. 6B, the main teeth 211 are not formed in the opening region S2 of the core 21B of the armature 20B according to the third embodiment, and only the coil 22 is present. In the case of the slot region S1 of the core 21 being configured only by the main teeth 211 in this way, the opening region S2 may be made a configuration in which the main teeth 211 are not formed.

Also in the armature 20B of the third embodiment, since the magnetic flux generated by the armature 20B (opening region S2 of the core 21B) hardly concentrates on the ends of the permanent magnets arranged at both sides of the non-thrust region D2, it is possible to suppress demagnetization of the permanent magnets 12 arranged at both sides of the non-thrust region D2.

Although embodiments of the present invention have been explained above, the present invention is not to be limited to the aforementioned embodiments, and various modifications and changes as in the modified examples described later are possible, and these are also included in the technical scope of the present invention. In addition, the effects described in the embodiments are merely listing the most preferred effects produced from the present invention, and are not limited to those described in the embodiments. It should be noted that the aforementioned embodiments and modified examples described later can also be used by combining as appropriate; however, detailed explanations will be omitted.

(Modified Examples)

The first embodiment shows an example in which the same auxiliary teeth 212 as the slot region S1 are formed in the opening region S2, as shown in FIG. 4B; however, it is not to be limited thereto. The formed region and unformed region of auxiliary teeth 212 may be intermingled in the X direction of the core 21. The first embodiment explains an example of the opening region S2 of the armature 20 being provided at the center in the Y direction; however, it is not to be limited thereto. The opening region S2 of the armature 20 may be provided at a plurality of locations in the Y direction.

The first embodiment explains an example defining the magnet plate 10 as the fixed side and defining the armature 20 as the drive side; however, it is not to be limited thereto. In the linear motor 1, the magnet plate 10 may be defined as the drive side, and the armature 20 may be defined as the fixed side (similarly applies for the second and third embodiments).

EXPLANATION OF REFERENCE NUMERALS

1: linear motor; 10: magnet plate; 11: plate; 12: permanent magnet; 20, 20A, 20B: armature; 21, 21A, 21B: core; 22: coil; 30: machine mounting part; 210: groove; 211: main tooth; 212: auxiliary tooth; D1: thrust region; D2: non-thrust region; S1: slot region; S2: opening region

What is claimed is:

1. A linear motor comprising:
   a magnet plate on which magnets of different polarity are alternately arranged along a movement direction; and
   an armature having a core serving as a main body and a coil attached to the core,
   wherein the magnet plate and the armature are made to relatively move along an arrangement direction of the magnets, by way of thrust produced between the magnet plate and the armature,
   wherein the magnet plate has a non-thrust region that extends along an arrangement direction of the magnets, and does not contribute to the thrust, and
   wherein the core of the armature includes a plurality of main teeth to which the coil is attached and an auxiliary tooth provided between the main teeth which are adjacent to each other, wherein the main teeth and auxiliary tooth are not provided in a region opposing the non-thrust region of the magnet plate.

2. The linear motor according to claim 1, wherein the non-thrust region of the magnet plate is a region in which the magnet is not provided.

* * * * *